Figure 1:
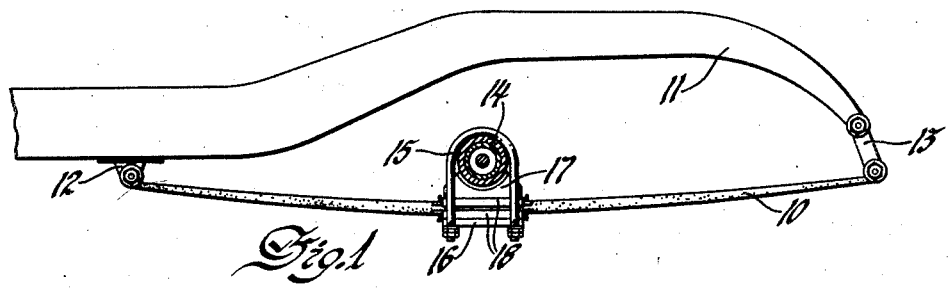

June 23, 1953  R. B. BURTON  2,643,111
SINGLE-LEAF SPRING CLAMP
Filed July 29, 1948

Inventor
Robert B. Burton
By
Spencer, Willits, Helmig & Baillio
Attorneys

Patented June 23, 1953

2,643,111

UNITED STATES PATENT OFFICE 2,643,111

SINGLE-LEAF SPRING CLAMP

Robert B. Burton, Detroit, Mich., assignor to General Motors Corporation, Detroit, Mich., a corporation of Delaware Application July 29, 1948, Serial No. 41,312

8 Claims. (Cl. 267—52)

1

For road gear suspension of motor vehicles it has been proposed to employ a flexible spring consisting of only a single metal leaf instead of the familiar multi-leaf or spring leaf pack between the sprung and unsprung parts. In general the installation of a single leaf spring may follow arrangements heretofore commonly used for multi-leaf springs, as in the conventional semielliptic spring mounting construction wherein pivotal joints connect opposite ends of the spring with the body or body supported chassis and a fixed connection joins an intermediate portion of the spring rigidly with the axle. The pivotal end joints may be afforded easily through eyes curled in the opposite terminals of the spring blade but the intermediate clamping connection between the single leaf and the axle has proven to be of critical importance because of the concentration of stress and the difficulties of breakage in the region of critical stress. Thus with a multiple leaf spring wherein individual leaf breakage is unlikely to be of serious consequence holes may be pierced in all the spring leaves to receive fastening bolts but with a load supporting spring consisting of only a single leaf similar bolt receiving openings entirely through the thickness of the leaf introduces weakness to fracture at a place where great strength and resistance is most needed.

To reduce liability of breakage and remove hindrances to adoption of single leaf springs it is here proposed to provide an improved spring leaf clamping arrangement which securely locates the axle and spring and effectively distributes load transference without strength destroying formations in the thickened flexible leaf. For a secure attachment without the additional expense and difficulties of specially forming a spring blade with integral anchorage projections there is here involved a simple spring leaf which can be made according to conventional leaf spring manufacturing procedure but having dimple formations or small depressions in the side edge faces thereof so as to lie in the neutral plane or axis of spring leaf flexure and to receive in keying relation corresponding pimples or projections on a spring encircling collar which itself is pocketed against relative displacement within a pair of clamp plates fastened to the axle in load distributing and transferring relation over a fairly large area of the adjoining spring leaf surface.

Of important significance is the location of the dimples in the region of minimum stress concentration. With respect to leaf thickness the fibers closest to the upper and lower surfaces will undergo greatest tension and compression stress and the central fibers will be stressed the least. That is with the conventional semielliptic spring arrangement and upon load deflection the uppermost fibers are stretched and the lowermost fibers are compressed and in each instance the extent of stress decreases from maximum at opposite surfaces to zero near the center and the ideal positioning of the dimple formations is in the region of zero stress. Also the dimples preferably should be about midway of the length of the clamping plates between which the spring leaf is held and which in a sense constitutes an axis about which the leaf portions which extend oppositely therefrom bend relative to one another under axle torque and other forces.

Figure 2:
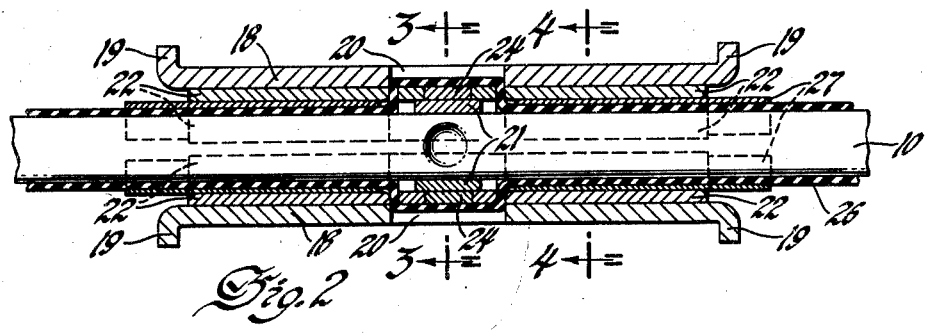
Figure 3:
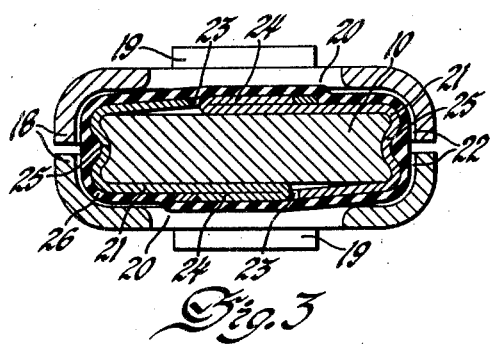
Figure 4:
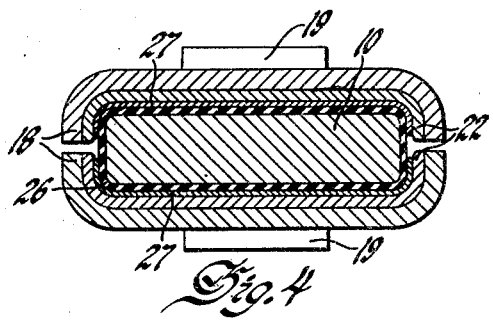
Figure 6:
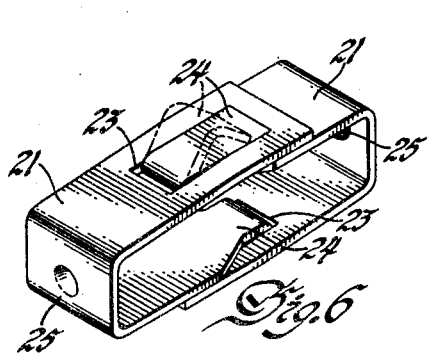
Figure 5:
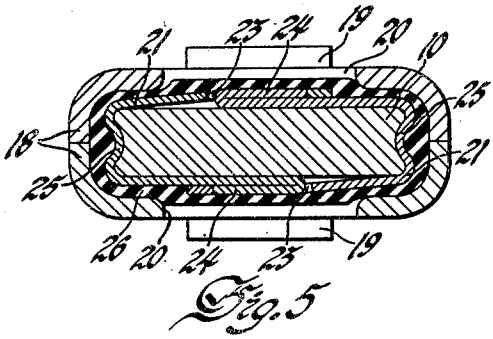

A more detailed description of the structure for clamping a single leaf spring to an axle without stress concentration in the spring will be given in connection with the accompanying drawing wherein Figure 1 is an elevation showing a load supporting spring between the chassis and axle; Figure 2 is a central longitudinal section of the clamped plates in gripping and locating relation to the axle attaching portion of the leaf spring intermediate its length; Figures 3 and 4 are transverse sections on lines 3—3 and 4—4, respectively, of Figure 2 but show the relation of the parts prior to the application of clamping pressure on the plates; Figure 5 corresponds to Figure 3 except that the clamped plates have been drawn together in final assembly relation and Figure 6 is a perspective view to illustrate in greater detail the spring embracing collar which keys together the clamping plates and the spring blade.

As seen in Figure 1 the opposite terminal eyes on the spring blade 10 are pivotally joined to the chassis 11, one by a hinge pin bracket 12 and the other by a swinging shackle 13, and the intermediate portion of the blade extends under and is fixed to the axle 14 by U-bolts on each side, one of which is shown at 15 in straddling relation to the axle with adjustable retainer nuts on the lower ends of the pins to engage the usual type of pressure plate 16 for cooperation with an axle chair 17 in holding a pair of clamp plates 18—18 which are of substantially U-shape in transverse section and are fitted in opposing relation to the spring leaf to box the same therein. At opposite ends the clamp plates 18 have outturned flanges or abutment ears 19 to seat against the ends of the pressure plate 16 and the axle chair 17 respectively and thereby preclude relative longitudinal displacement. In addition these ears 19 may fit into grooves formed in ends of either or both the axle chair 17 and the pressure plate 16 to provide positive lateral alignment. Both clamp plates have a central transverse slot or opening 20 to form pockets or keyways to receive protuberances or centrally thickened portions on the top and bottom of a collar or spring embracing strap or clip member shown as consisting of a pair of identical internested U-shaped clips 21—21. As shown each plate 18 is interiorly lined by a pair of channels 22—22 extending from adjacent the outturned end flanges 19 to the central slot 20 with their adjacent ends in line with the slot edges to assist in providing abutment shoulders for the clips 21. Preferably the liners 22 are welded in place as a one-piece unit with the respective plates 18. Optionally the plates 18 may be so made and used as to eliminate the separate formation and attachment of channel liners.

Each clip 21 is made from strip stock cut to length with metal removed at opposite ends so as to form a rectangular slot 23 at one end and a terminal tongue 24 at the other end of reduced width corresponding substantially to the width of the slot 23 so as eventually to fit therein. Intermediate its ends the strip is struck with a rounded nosed tool to deform the metal and provide a concavo-convex pimple or bump 25 of spherical radius or of tapering depth. The spherical shape is easy to make and perhaps is stronger than a tapered cone shape but any equivalent tapered formation would serve the desired purpose and to which reference will be made later. The strip is also bent to U-shape with the bump 25 centrally located and facing inwardly in the base thereof and the tongue 24 is bent back upon itself first to substantially V-shape, as shown by broken lines in Figure 6, and later into flattened relation, as in Figures 3 and 5. A pair of clips 21 are then applied from the opposite edges of the spring leaf 10, which in its manufacture has been dented or formed with dimples corresponding in shape with the convex surface of the pimple 25. The location of the dimples in the spring side edges is such that they lie in the region of the neutral axis of the spring leaf with reference especially to their apices or points of greatest depth. Thus when the convex depressions are seated within the concave dimples the parts will be keyed together against longitudinal displacement without the need for removing metal from the spring in a manner which would be likely to weaken the spring in a region of critical stress. By reversing the clips in relation to one another their slotted ends 23 can be caused to ride over and into latching relation with the reversely bent tongues 24. This can best be done when the tongues are in the broken line V-shape of Figure 6 so that when each tongue is finally flattened its end bears tightly against the adjacent end of the companion clip and both clips are drawn into snug bracelet relation with the spring and secure internested relation with each other.

To cushion impact from flying stones kicked up upon vehicle operation and otherwise minimize scratches and corrosion which might lead ultimately to blade fracture a protective covering 26 of rubber or the like completely encases the spring leaf from end to end and is molded in place or otherwise enveloped on the spring after the clips 21 are applied. Separators 27 of sheet packing material are interposed between the rubber coating and the clamping plates 18. When the clamp plates are first applied but before the adjusting nuts on the U-bolts 15 are drawn up the uncompressed or free thickness of the rubber coating holds the clamp plates slightly spaced apart a desired predetermined distance as can be seen in Figures 3 and 4. The given spaced apart relation of the clamp plates governs the extent to which the nuts can be tightened, the limit being established by the abutment of the clamp plates, as seen in Figure 5. The clamping pressure squeezes the rubber and insures a good frictional hold between the parts while also cushioning and insulating excessive transmission of axle torque and road shock into the spring and through the spring to the chassis. It will be noted further that the squeezing pressure on the rubber causes it to crowd into and more completely fill up the exterior concavities afforded by the bumps 25 and effectively back up these deformations to insure their interlocking retention within the dimples at the neutral axis of the spring. Obviously, the advantages of the rubber lining may be had with rubber pads and without extending the covering over the whole of the spring as a complete enclosure therefor.

I claim:

1. In a vehicle having sprung and unsprung parts, a single leaf spring through which the load is transferred between said parts, spring end connecting means joining the spring to one of said parts and a spring intermediate connection with the other part comprising dimples in opposite side faces of said single leaf spring occupying the zone of the neutral axis of bending, a collar surrounding said leaf spring and carrying internal projections fitted in interlocking relation to said dimples, a protective covering of elastic deformable material enveloping said spring leaf and said collar, a pair of clamp plates fitted to the top and bottom of the spring leaf and about said covering and having recessed portions to receive and interlock with portions of said collar, and fastening means anchoring said other part to the clamp plates and being arranged to press the clamp plates toward one another for squeezing the covering engaged thereby and effecting tighter interlock with said collar and between said collar projections and the side face dimples in the spring leaf.

2. In combination, a single leaf spring having a dimple in its side on the neutral axis of the spring, a pair of U-shaped fittings embracing the spring leaf in interlocked relation and having a projection in keyed relation to said dimple and clamp plates in interlocking engagement with said fittings.

3. In combination, a load supporting spring consisting of one leaf only, said spring having dimples in the side edge faces thereof, a pair of complementary U-shaped locating straps fitted together with the legs overlapping to form a leaf encompassing collar, the base of each strap having a pimple to seat in a corresponding dimple in the leaf, and one leg of each strap having a narrowed terminal reversely bent upon the strap and fitted in latching relation within an opening in the other leg of its complemetal strap and a pair of clamp plates engaging top and bottom faces of said leaf in interlocking relation with said straps.

4. In combination, a load supporting spring consisting of only one leaf, said leaf having concavities in the edge faces thereof, a collar surrounding the leaf in the region of said concavities and having internal convexities fitted to the concavities of said leaf and also having external concavities, a lining of deformable material surrounding said collar and filling said external concavities and a pair of clamp plates fitted over the top and bottom of the leaf and lining with locating pockets in keying relation to said collar and arranged when drawn together under clamping pressure to crowd the lining into more secure confinement within said external concavities.

5. In a vehicle suspension or the like, a single spring leaf and a mounting connection at an intermediate portion in the length of the spring leaf, one edge of said spring leaf being provided with a depression spaced from the upper and lower surfaces thereof, a clip member engaging said intermediate portion of the spring leaf and provided with a projection extending into interlocking engagement with said depression, and clamp plates being fitted to the top and bottom of the spring leaf and about said clip member and provided with recesses adapted for interlocking engagement with portions of said clip member, for the purpose set forth.

6. A vehicle suspension or the like comprising, a single spring leaf, and a mounting connection therefor at an intermediate position in the length of the spring leaf including, a clip member engaging said intermediate portion of the spring leaf, a recess in one edge of said spring leaf located wholly within the boundaries thereof, a projection on said clip member having an interlocking engagement with said recess, relatively movable clamp members embracing said clip member and provided with means effecting an interlocking engagement with said clip member, and a clamp bolt connection extending about said spring leaf, said clip member and said clamp members, said clamp bolt connection being contractable upon said clamp members to hold said clamp members in said engagement with said clip member.

7. For the anchorage of a single spring leaf to a joining element and in which the spring leaf has tapering depressions wholly formed within and midway between the opposite edge faces of said spring leaf, and comprising a pair of interlocking clip members encircling the region of the spring leaf having said depressions therein and having key elements seated in said depressions to interlock said spring leaf and said clip members, and clamp members embracing said clip members and having means clamping said clamp members in interlocking engagement with said clip members.

8. In a vehicle suspension or the like, a single spring leaf having a dimple formed in a side edge face thereof, a clip member closely encircling an intermediate portion of said spring leaf and having a projection extending therefrom and into said dimple to interlock said clip member and said spring leaf, and clamp plates gripping said spring leaf and abutting a portion of said clip member, said clip member being positioned between said clamp plates to key said clamp plates and said spring leaf against endwise displacement.

ROBERT B. BURTON.

References Cited in the file of this patent

UNITED STATES PATENTS

| Number | Name | Date |
| --- | --- | --- |
| 296,994 | Morris | Apr. 15, 1884 |
| 901,162 | Fay et al. | Oct. 13, 1908 |
| 2,052,930 | Laursen | Sept. 1, 1936 |
| 2,123,772 | Eisenhauer | July 12, 1938 |
| 2,211,647 | Collier | Aug. 13, 1940 |
| 2,533,511 | Rowland | Dec. 12, 1950 |

FOREIGN PATENTS

| Number | Country | Date |
| --- | --- | --- |
| 526,407 | Great Britain | Sept. 17, 1940 |
| 664,516 | France | Apr. 23, 1929 |